Feb. 24, 1942.　　　F. V. HART　　　2,274,060
MOLD AND MOLD MAKING METHOD
Filed Oct. 31, 1938
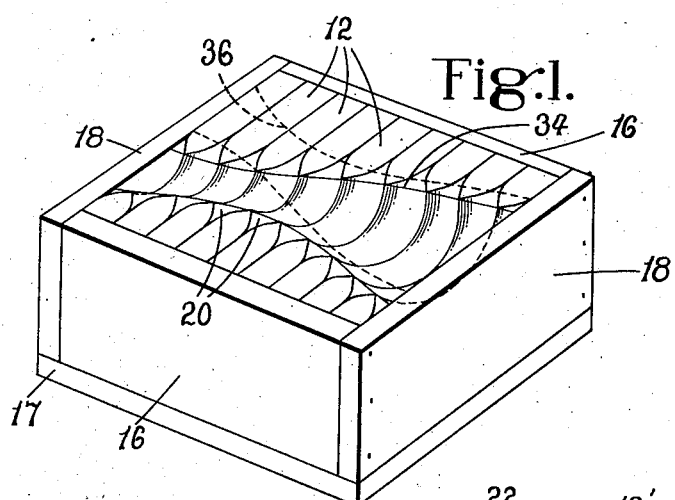
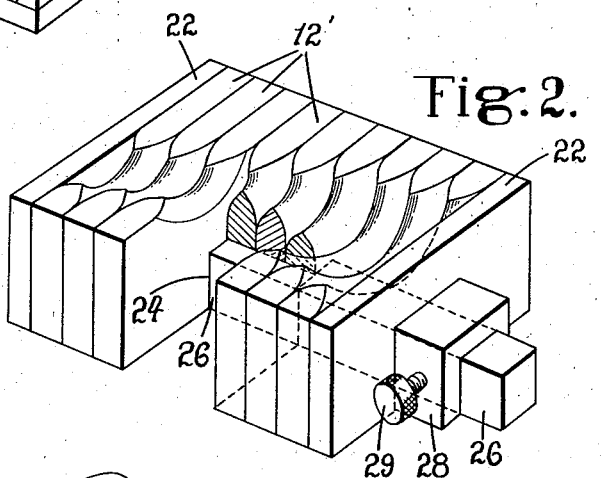
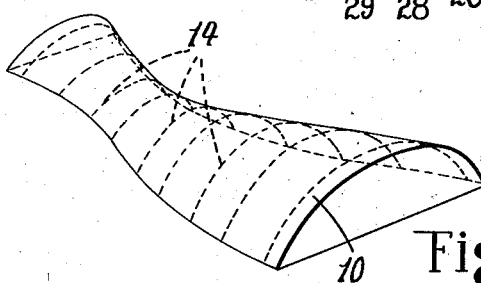
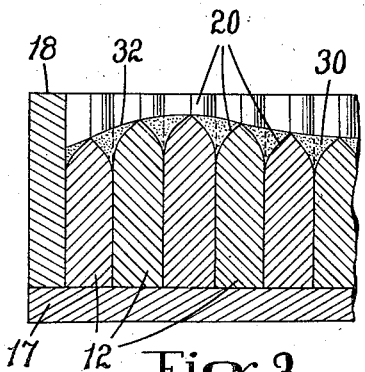
INVENTOR
Fred V. Hart
By his attorney
Victor Cobb Patented Feb. 24, 1942

2,274,060

UNITED STATES PATENT OFFICE 2,274,060

MOLD AND MOLD MAKING METHOD

Fred V. Hart, Lynn, Mass., assignor to United Shoe Machinery Corporation, Borough of Flemington, N. J., a corporation of New Jersey Application October 31, 1938, Serial No. 237,917

7 Claims. (Cl. 18—44)

This invention relates to the reproduction of a model and is exemplified herein with reference to a mold and molding process for use in producing duplicate and geometrically similar but reversed reproductions of a model.

In many arts, as in that of shoemaking, for example, it is often desirable to employ a form or shaping member to assist in the preliminary shaping of shoe parts, which form or member is to have the same shape as, or a shape related to, that of a last or a part thereof. Commonly, as in the case of shoemaking, such forms are used in pairs comprising exactly similar right and left forms each of which is the mirror image of the other. Forms of the type referred to may be made by a cut and try method comprising the steps of making a pattern as nearly like the model as possible as judged by the eye and with the aid of suitable measurements, and then making a casting in the usual way by the use of the pattern. However, this method of making a pattern is subject to the disadvantages of expense and inaccuracy entailed by a large amount of hand work; and these disadvantages are aggravated in the production of a pair of right and left forms, especially if only one model, a right or left, is available, because of the difficulty of making two patterns which are exactly alike as to size and the different parts of which are disposed in exactly opposite relation so that the patterns are true rights and lefts.

In view of the foregoing, it is a general object of this invention to obviate the difficulties referred to above and to provide an improved mold and molding method by the use of which it is possible to make directly a pattern which is a duplicate of a model and a second pattern which is a reversed or mirror-image reproduction of the model, the relation between the duplicate and reversed reproduction of the model being the same, for example, as that between right and left lasts or like sections thereof.

To this end, the invention provides a mold having templates shaped in conformity to a series of contours of a model, the templates being mounted so as to be held in the same relation as that between the contours or in a reversed relation, a mold surface in each case extending between the templates. Thus, since the same templates are used in making a mold for both a duplicate and reversed reproduction of the model, corresponding parts of the reproductions are exactly alike in shape but have a true "right and left" relation to each other.

The mold surface may conveniently be made by providing filling material, such as a self-hardening plastic material between the templates, the filling material being smoothed so that its surface is continuous with and includes the shaped edges of the templates. Thus, the resulting mold surface will have a form exactly complementary to that of the model and upon being filled with a moldable pattern material imparts to the latter the exact form of the model. After the pattern has hardened and has been removed from the mold, it may be used in the usual way in making a casting which is an exact duplicate of the model.

The positioning of the templates in the above manner is facilitated by the use of two sets of positioning surfaces adapted to be selectively held in engagement with each other, the templates being arranged in making a mold for a duplicate of the model so that one set of positioning surfaces are in engagement with each other, the other set of positioning surfaces being held in engagement with each other when the templates are rearranged to produce a mold for a reversed reproduction of the model.

In another aspect the invention provides methods of making a mold of any of the types referred to above.

These and other features of the invention will appear more fully from the following detailed description when read in connection with the accompanying drawing and will be pointed out in the appended claims.

In the drawing,

Fig. 1 is a view in perspective of an illustrative mold made in accordance with the invention and by the use of which the method disclosed herein may be carried out;

Fig. 2 is a view in perspective of an alternative form of mold;

Fig. 3 is a fragmentary longitudinal sectional view indicating the relation of the templates and filling material in the mold of Fig. 1; and Fig. 4 is a view in perspective of an illustrative model of which duplicate and geometrically similar but reversed reproductions are to be made.

In practicing the present invention the reproduction of a model 10 (Fig. 4), for example, is effected by the use of a mold the essential feature of which consists in the provision of a series of templates 12 (Fig. 1), 12' (Fig. 2) each of which has a surface defining an edge which is shaped in conformity to one of a series of contours such as 14 (Fig. 4) of the model 10, the templates being arranged in the construction of the mold so that the relation between their shaped edges is the same as or similar to that between the various contours 14.

For purposes of illustration, the contours 14 as illustrated herein are formed by the intersection of equally spaced parallel planes with the surface of the model 10, the planes extending crosswise of the model; but it is to be understood that the invention contemplates the use of templates shaped in accordance with contours having any suitable relation to the model, the relation between the templates as arranged in the mold being the same as, or similar to, the relation between the contours themselves.

In both of the embodiments of the invention illustrated in Figs. 1 and 2 the positioning of the templates in the manner referred to above is effected by the use of sets of positioning surfaces on the templates and holder or positioning member. In the mold illustrated in Fig. 1 the templates 12 are mounted side-by-side in contact with each other, their ends constituting positioning surfaces and being in alinement with each other when the shaped edges of the templates are positioned properly with respect to each other. The templates are thus held between the sides 16 of a box 17, which serves as holder or positioning member, the box having ends 18 which are engaged by the endmost templates and prevent the templates from separating laterally. If, as in the mold of Fig. 1, the templates 12 have a thickness equal to the spacing of the contours 14 and are mounted side-by-side in contact with each other, their shaped edges being formed midway between the sides of the templates at the vertex of chamfered surfaces 20 (Fig. 3) extending inwardly of the templates from their sides, the relation of the shaped edges of the templates 12 longitudinally of the box 17 is the same as the relation between the contours longitudinally of the model. The shaped edges of the templates 12 are so formed that they also have the same heightwise relation as that between the contours 14 when the bottom edges of the templates 12 are seated on the bottom of the box.

Illustrative of other ways in which the arranging of the templates may be effected within the scope of the invention, reference will now be made to an alternative mold construction illustrated in Fig. 2. The templates 12' of this mold, after being formed in the same manner as described above in connection with the mold of Fig. 1, are assembled between end covers 22 the bottom edges of the covers 22 and the templates 12 being in the same plane and having recesses 24 which are in alinement with each other when the shaped edges of templates are in their proper relation. The groove formed by the alined recesses 24 is adapted to receive a holder or positioning member in the form of a bar 26 the sides of which fit closely within the sides of the recesses 24. The templates 12' are prevented from separating from each other by clamps 28 adapted to bear against the covers 22 and to be adjustably fixed to the bar 26 by set screws 29.

The templates 12 or 12' now having been arranged so that their shaped edges have the same relation to each other as that between the contours of the model, the mold of either Fig. 1 or Fig. 2 is next completed by forming a continuous smoothly curved mold surface defined by the contours of the templates. This feature of the construction of the molds results from the use, as illustrated in Fig. 3 for example, of filling material 30 placed between the chamfered surfaces 20 of the templates and an envelope 32 of the shaped edges of the templates. This filling material conveniently may be in the form of a plastic material, such as plaster of Paris, which is capable of being troweled between the templates continuously with their shaped edges, the plastic being self-hardening after a certain length of time. The edges of the templates are (in the geometric sense) elements of the mold surface.

It will now be understood that the invention provides a mold having a surface which is exactly complementary to the model and also a molding method by the use of which an exact duplicate of the model can be made.

In making a geometrically similar but reversed or mirror-image reproduction of the model 10 which may also be termed an enantiomorphic reproduction, the templates 12 and 12' of the mold constructions illustrated in Figs. 1 and 2, respectively, are assembled in the same order as before but are turned end for end. In thus rearranging the mold of Fig. 1, for example, the templates 12 are removed from the box 17 one by one and turned so that the positions of the ends of each template are interchanged, the ends of the templates again being held in alinement with each other by the sides of the box 16. Thus, corresponding contours of the reproduction made from the original mold illustrated in Fig. 1 and the rearranged mold are exactly alike but are in a true right and left or mirror-image relation, as indicated by the solid and dotted lines 34 and 36, respectively, in Fig. 1.

A similar result is effected in the use of the mold illustrated in Fig. 2 by rearranging the templates 12', each template being removed from the bar 26, turned end for end, and repositioned on the bar, the latter being received in the recesses 24. It is to be understood, of course, in connection with both types of molds that a new mold surface is formed in the manner described above after the templates 12 or 12' have been reversed and that a reproduction made from such a mold will differ from the model only in being a "right" reproduction, if the model is a "left," or vice versa. Each is the mirror image or enantiomorphic reproduction of the other.

Although for the sake of convenience the templates 12 are made to fit closely between the sides of the box 17 and the recesses 24 and templates 12' are formed so as to receive the bar 26 with a close fit, the positioning of the templates in the case of either mold can be accomplished so long as there are two sets of positioning surfaces on the templates and the holder or positioning member in the case of each mold. For example, and with reference to a single template 12 of the mold of Fig. 1, one end of a template and the adjacent side of the box may be considered as constituting one set of positioning surfaces, the other end of the template and the same side of the box constituting the second set of positioning surfaces which are to be brought into engagement with each other when the template is turned end for end. Similarly, it may also be considered that the one end of a template 12 and one side of the box 17 constitute one set of positioning surfaces and that the same end of this template and the other side of the box constitute the second set of positioning surfaces. It is thus apparent that the positioning of the templates, to provide either a right or left mold may, if desired, be effected by the use of either a box having only one side and templates having a positioning surface on each end or by the use of a box having two sides each of which serves as a positioning surface and a set of templates each of which has a positioning surface at one end only.

It is also apparent that a similar relation exists between the bar 26 and the sides of the recesses 24 in the templates 12' of Fig. 2 and that the proper alinement of the templates 12' can be effected when they are either in their normal or reversed positions by insuring that the same sides of all of the recesses 24 are in engagement with one side or the other of the bar 26 if, for the purpose of facilitating the rearrangement of the templates, it may be desirable that the width of the recesses 24 be substantially greater than that of the bar 26.

Having thus described my invention, what I claim as new and desire to secure by Letters Patent of the United States is:

1. That improvement in methods of making duplicate and reversed reproductions of a model which consists in forming a plurality of templates in conformity to a series of contours of the model formed by the intersection therewith of a plurality of parallel planes, arranging said templates so that their contours have the same relation to each other as that between the corresponding contours of the model, forming a mold surface between said templates, forming an impression of said mold surface thereby producing a duplicate of the model, removing said mold surface from said templates, turning each of said templates end for end but maintaining their relation otherwise the same as before, forming a second mold surface between said templates and forming an impression of the second mold surface thereby producing a similar but reversed reproduction of the model.

2. That improvement in methods of making duplicate and reversed reproductions of a model which consists in forming a plurality of templates in conformity to a series of contours of the model formed by the intersection therewith of a plurality of parallel planes, each template having a positioning surface, arranging said templates so that when their positioning surfaces are in alinement the contours of said templates have the same relation to each other as that between the corresponding contours of the model, forming a mold surface between said templates, forming an impression of said mold surface thereby producing a duplicate of the model, removing said mold surface from said model, rearranging said templates in the same order and with their positioning surfaces in alinement but each template being turned end for end, forming a second mold surface between said reversed templates, and forming an impression of said second mold surface thereby producing a similar but reversed reproduction of the model.

3. That improvement in methods of making duplicate and reversed reproductions of a model which consists in forming a plurality of templates in conformity to a series of contours of the model formed by the intersection therewith of a plurality of parallel planes, arranging said templates with their ends in alinement with each other and so that their contours have the same relation to each other as that between the corresponding contours of the model, forming a continuous mold surface defined by said templates, forming an impression of said mold surface thereby producing a duplicate of the model, removing said mold surface from said templates, rearranging the templates in the same order but so that the positions of the ends of each template are interchanged, forming a second continuous mold surface defined by said templates, and forming an impression of said second mold surface thereby producing a similar but reversed reproduction of the model.

4. A mold comprising a plurality of templates which are recessed to provide edges shaped in conformity to a series of contours of an asymmetric model, said edges defining sectional contours of the cavity of the mold and extending continuously between opposite points on the rim of the cavity, a holder for said templates effective to maintain them in assembled position with the relation between their edges and the contours of the model the same to produce a duplicate of the model, and means disposed in the spaces between the shaped edges and cooperating with said edges to form a smooth continuous molding surface at said edges.

5. A mold comprising a plurality of templates having recesses the edges of which are shaped in conformity to a series of contours of an asymmetric model, said edges being elements of the surface of the cavity of the mold and extending continuously between opposite points on the rim of the cavity, a holder for said templates arranged to maintain them in assembled position with the relation between their edges and the contours of the model reversed to produce a mirror-image reproduction of the model, and filling material disposed in the spaces between the shaped edges and cooperating with said edges to form a smooth continuous molding surface at said edges.

6. That method of making a reversed or enantiomorphic reproduction of an asymmetric model which includes the steps of forming recesses in a plurality of templates to provide edges which conform to a series of contours of the model and which extend continuously between opposite points on the rim of the mold cavity defined by said templates, reversing each of the templates and assembling them so that their edges are in enantiomorphic relation to said series of contours of the model, thereby to form portions of the surface of a mold for forming an enantiomorphic reproduction of the model.

7. That method of making a reversed or mirror-image reproduction of a model which consists in forming recesses in a plurality of templates to provide edges which conform to a series of sectional contours of the model and which extend continuously between the opposite points on the rim of the mold cavity defined by said recesses, arranging the templates so that said edges form a series which is the mirror image of said series of contours of the model, and filling the space between the edges with material to form a smooth surface of which the edges are elements, whereby a smooth surfaced mold is formed in which a reversed or mirror-image reproduction of the model can be molded.

FRED V. HART.